Jan. 28, 1964 J. CUNETTA 3,119,770
SEWAGE TREATMENT METHOD AND APPARATUS
Filed May 7, 1959 3 Sheets-Sheet 1

Inventor,
Joseph Cunetta,
By: Schneider, Dressler, Goldsmith & Clement,
Attys.

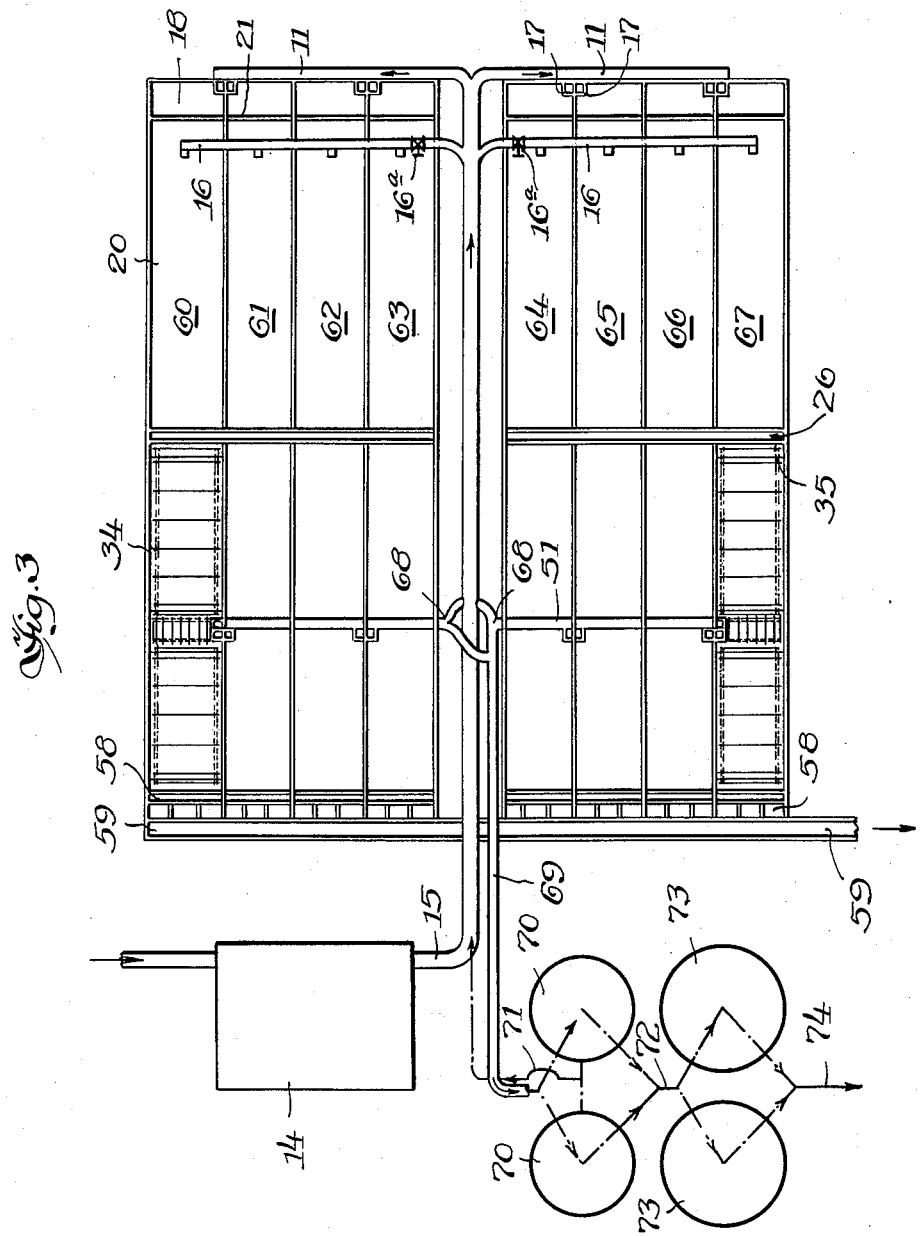

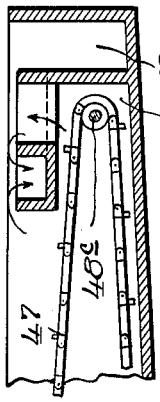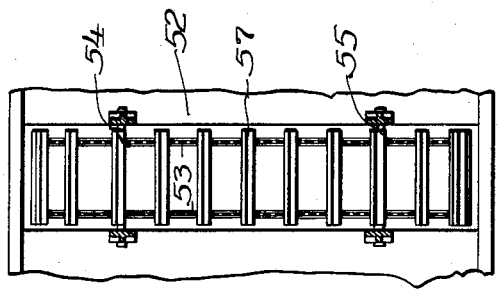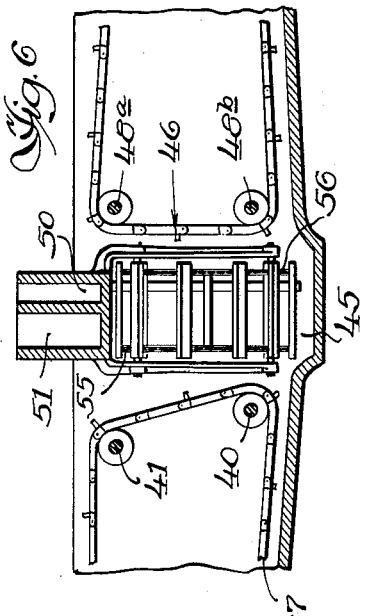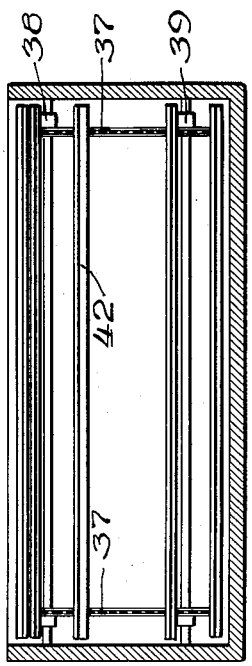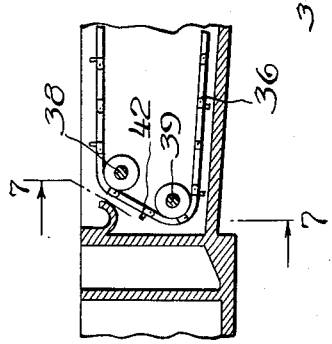
Inventor,
Joseph Cunetta,
By Schneider, Dressler, Goldsmith & Clement,
Attys.

3,119,770
SEWAGE TREATMENT METHOD AND APPARATUS
Joseph Cunetta, 164 Parkside Ave., Brooklyn, N.Y.
Filed May 7, 1959, Ser. No. 811,656
17 Claims. (Cl. 210—15)

The present invention relates to improvements in the treatment of sewage and/or industrial wastes. More particularly, it relates to the aeration treatment of sewage. Still more particularly, it relates to apparatus for carrying out the new method of treatment comprising a single tank for grit removal, aeration and sedimentation.

Processes for the treatment of sewage or sewage sludge or industrial wastes as commercially practiced, have been time consuming operations. In order to speed treatment and to increase the capacity, particularly of existing equipment, attempts have been made to develop compact plants with simplified and improved activated sludge forming methods. A considerable part of this effort has been concentrated upon improvement in the primary or partial treatment methods.

Operations which make up a primary or partial treatment for raw sewage have consisted of means for intercepting floating or coarse solids which could clog pump or pipe lines. Intercepted material is either removed from the system or comminuted to suitable size for return to the sewage flow.

Following comminution, the sewage is introduced into a chamber where the heavy inert particles such as sand, cinders, etc., will settle out while the organic particles will remain suspended in the flow. Following the grit chamber suspensions of the organic material are subjected to aeration with or without primary settling.

Applicant has discovered that many existing plants may be converted to a simplified and improved operation of high capacity and that new plants, have improved operating characteristics, may be built giving highly efficient aerobic treatments by the incorporation of aeration tank and sedimentation tank into an integral unit with sewage flow through the tank segments being continuous consecutive operations. Such tanks may advantageously contain a grit tank segment at the influent end thereof.

These treatment units handle either raw domestic or raw industrial waste with or without primary settling and may be incorporated into systems designed for standard or high rate type of activated sludge treatment plants.

The process for treating sewage in accordance with this invention comprises essentially flowing sewage in a suspendable particle size form into a segmented flow course, maintaining the liquid level of the flow course by withdrawing at least partially clarified liquor over a weir or through outlets longitudinally removed from the sewage inlet, maintaining turbulent conditions and settling conditions in contiguous tank segments, maintaining continuous flow between contiguous segments without interfering with conditions maintained in each segment through damping the turbulence of the aerated sewage as it passes to a subsequent flow course segment by flow through a multiplicity of discontinuous channels laterally communicating with one another to create a multiplicity of circuitous paths through the flow course segmenting unit.

Apparatus designed to carry out this process consists of an elongated tank having a bottom, end and side walls, a baffle consisting of multiple spaced plate members, each of said plate members being provided with a plurality of openings, each of said openings being positioned opposite an unperforated area in each adjacent plate to form a multiplicity of discontinuous channels which communicate with one another laterally to create a multiplicity of circuitous paths preferably at all elevational levels for flowing sewage from one tank segment to another tank segment in which second tank segment treatment conditions are maintained such that liquid movement in the one segment cannot be allowed to disturb flow conditions in the other segment. Turbulent conditions in sewage treatment systems are usually created by agitating and/or mixing the solids through introduction of gas or air into and through the body of sewage. Means is provided for introducing the air into the body of the liquid from a region adjacent at least one of the two lateral walls of a tank segment. In settling or sedimentation segments, means is provided for removing solids from the bottom thereof. Overflow means is provided for control of liquid level in said tank.

More in detail with regard to the process, sewage or industrial waste after suitable screening or comminution, or both, flows into an elongated tank. The elongated tank provides contiguous segments or compartments with minimum obstruction to flow of sewage suspension but with sufficient division of the tank to produce clearly defined and different treatment zones.

In this flow-through treatment system, raw sewage which may or may not have return sludge and/or thickener overflow mixed therewith, is fed to the forward or upstream end of the treating unit. Flow of sewage suspension is distributed to the individual flow courses by appropriate control means. If return sludge and/or thickener overflow is not mixed with the raw sewage, these materials may be jointly or separately added to material in the flow course at any point prior to substantial completion of the aeration step, although preferably the return sludge and/or thickener overflow are added in a manner insuring thorough distribution at a time when the sludge mixture is being aerated. The return materials may be incorporated into raw sewage prior to or at the time of passage through a grit chamber because such mixing, normally presents no difficulty insofar as the quality of the removed grit is concerned.

If the treatment unit has an integral grit chamber for removal from a flowing liquid stream of heavy solid matter, this chamber segment is of such volume as compared with the volume of influent material as to maintain a suspension flow velocity from which the grit may settle by gravity. Such a grit chamber may also be of the aerated type wherein gas is introduced at a point removed from the floor of the grit chamber, and at one side thereof so as to form a quiescent zone below the aeration equipment. Air, in this situation, is usually introduced along a wall of the tank so as to circulate air-liquid mixture in a generally vertical plane, the gas being introduced in volumes so as to maintain organic material in suspension and allowing heavy inert material to settle out.

When moving sewage through the grit chamber under the stated conditions, heavy solids settle to the grit chamber floor while at the same time the flow is sufficient to maintain the lighter organic materials in suspension. If the floor of this grit chamber is sloped downwardly at a slight angle such velocities will wash the grit free of organic material while moving the grit to the low end of the chamber or to a sump. When operating tanks of approximately 60 foot width and 15 foot depth the aeration equipment is generally positioned about two to four feet above the floor of the grit chamber, thus providing for an accumulation zone behind a suitable dam.

Dam separating a grit chamber from a contiguous aeration chamber may be and generally are adjustable in height so that changes may be made to compensate for changes in liquid level in the tank. Dams usually are maintained at a height which is a half to two-thirds of the liquid depth. Removal of grit accumulated behind such dams may be any conventional manner. Grit may be removed, for example, by a bucket supported by a gantry crane or if the grit is accumulated in a localized area it may be removed by endless chain bucket conveyor or an air lift provided the lift height does not exceed about 5 to 10 feet above the water surface of the tank. Jet pumps may also be used for removal of grit particularly where the discharge is to elevated dewatering devices.

Suspended solids and liquid may have an unrestricted flow from the grit chamber through the space between the top of the wall or dam and the water level, or may pass through a hereinafter described baffle means, depending upon the nature of the processing step carried out in the contiguous tank segment.

If the next segment of the flow course is an aeration segment, the raw sewage travels slowly while air is forced into and through the sewage by means of diffusers. Aeration is for the purpose of supporting bacterial growth which effects a reduction of the sewage to a form which is relatively completely settleable. Aaeration for sewage treatment will preferably average between about 250 and about 1,500 cubic feet per pound of Biochemical Oxygen Demand, abbreviated B.O.D. Loading to the aeration tank will generally vary between about 25 and 150 pounds of B.O.D. per 1,000 cubic feet of aeration tank volume. The minimum amount of air which may be introduced for an aeration operation is that which is required to maintain circulation of the suspension. The maximum quantity of air required to obtain good reduction of the sewage will depend upon the sewage strength.

Aeration may be accomplished by positioning adjacent the bottom of the treatment zone one or a series of diffuser elements positioned along either or both lateral walls or at intermediate points between the walls. The diffusers may be of any type varying from an open pipe, through course bubble diffusers to fine bubble diffusers, such as perforated plastic tubing and perforated metal tubing with or without rope or cord winding, or the like.

Separating this aeration segment from the sedimentation segment of the tank is a baffle wall designed to provide uniform distribution of influent flow across the entire cross-sectional area of the segment, to eliminate the spiral currents created in the aeration segment and to remove turbulence so that the entire length of the sedimentation segment may be an effective settling zone. If turbulence were to be permitted beyond the baffle area, only the downstream portions of the contiguous tank segment would be an effective settling zone and there would be little or no chance for the formation of density currents in the forepart of the sedimentation segment which currents assist in rapidly settling sludge of the best biological condition. Sedimentation tanks designed to take advantage of density currents permit separate withdrawal in a relatively short time, of a sludge of optimum biological condition for return to the aerobic environment in the aeration segment of the flow course and a relatively sludge free effluent. Following substantial concentration of the sludge, density currents tend to rise and this upturn influence must be avoided by locating the effluent weirs across and at a point forward of the rear wall to insure optimum quality of removed effluent. By locating the weirs beyond the density current "upturn influence," solids moving in the rising current will be allowed to settle in the portion of the sedimentation segment downstream from the sludge accumulation and removal zone and not be entrained in the effluent stream.

Sludge may be collected in and removed from the sedimentation zone by conventional means. With smaller treatment units, sludge may be accumulated for removal at a point proportionally further removed from the influent end of the sedimentation segment than in larger units. With larger treatment units, the sludge may be scraped to a cross collector channel at an intermediate point in, and usually near the center of the sedimentation segment and conventional sludge collector mechanism utilized to move the accumulated sludge exteriorly of the flow course. In the preferred embodiment of the invention, sludge is removed from the cross collector channel by either a hydrostatic lift or an airlift into an activated sludge channel or conduit. This activated sludge discharge is preferably split into a portion which is recycled to the flow course while the remainder is wasted to other disposal means.

Final effluent or clarified liquor is removed from the end of the compartment furthest removed from the sewage inlet. Transverse weir and troughs are used to remove the final effluent, and to control liquid level over the entire length of said tank. The weirs are preferably set back sufficiently to overflow a reasonably polished effluent.

Scum and grease floating in the sedimentation compartment is collected at the upstream end of this compartment by the return of flights or skimming blade of the sludge collector mechanism moving adjacent the liquid surface. This scum and grease is forced into scum troughs and flows to sumps for pumping or to scum tanks for final disposal.

Scum troughs are located on the downstream side of the double baffle wall construction separating the aeration and sedimentation compartments. These baffles will be more fully described in conjunction with the description relative to the drawings in which:

FIG. 3 is a top plan view of a complete treatment plant for sewage;

FIG. 6 is an enlarged fragmentary view of the sedimentation segment of the tank;

FIG. 7 is a longitudinal view of a sludge collector; and

FIG. 8 is a view along line 7—7 of FIG. 6.

Figure 1:
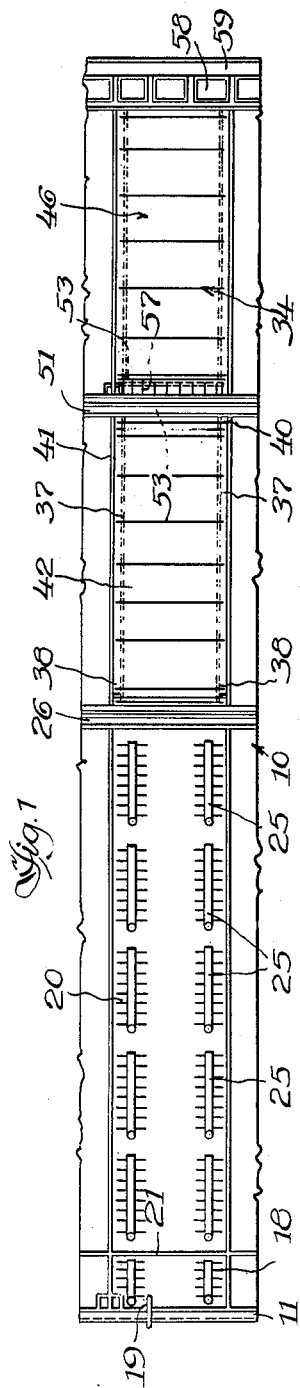
FIGURE 1 is a top plan view of a single tank.
Figure 2:
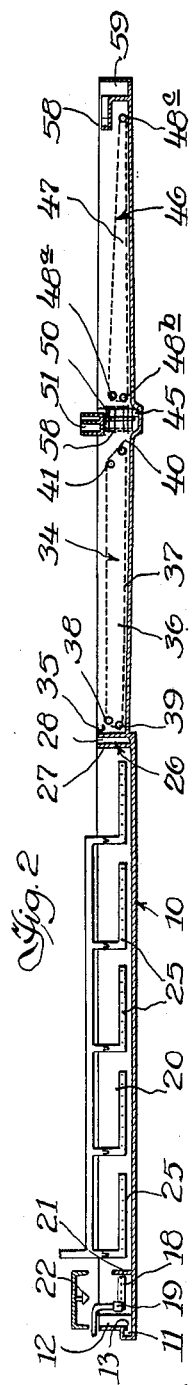
FIG. 2 is a longitudinal sectional view of a single tank.

In the drawings, the elongated tank is indicated by the numeral 10. Tank 10 is adapted with an influent channel 11 communicating with a riser conduit 12 through a sluice gate 13. Raw sewage delivered from screening station 14 through conduit 15 is here shown as mixed with return or recycle sludge and usually with thickener overflow, although recycle sludge, etc., may be moved in separate conduit for introduction in desired segments of the flow course. This mixture is discharged through riser conduit 12 over inlet control weirs 17 into the aerated grit chamber segment 18. Alternatively, the raw sewage mixture may be discharged into the aeration segment of the flow course through conduit 16 or the feed split between the aeration and grit chamber segments in any desired proportions under control of sluice gates 13 and valve 16a in conduit 16.

Segment 18 is provided with suitable aeration means 19 such as a gas diffuser suspended 2 to 4 feet above the floor of segment 18. Segment 18 is separated from the aeration chamber 20 by a wall or dam 21 which provides a retainer for accumulated grit. Grit is removed from grit chamber 18 by suitable means 22 such as a bucket actuated from a gantry crane.

Aeration chamber segment 20 of tank 10 is adapted with diffuser means 25 for passing gas or air into and through the flowing stream of sewage. Gas is fed to the diffuser through conduit from gas blowers at pressure usually of from 5 to 10 lbs. per square inch, these being conventional equipment not requiring illustration.

Aeration chamber segment 20 carries flowing sewage subject to stronger agitation than it receives in the aerated grit chamber. Segment 20 terminates at the baffle unit 26 which passes the aerated sewage preferably at all elevational levels within the liquid while quickly eliminating the currents which would maintain the sewage solids in suspension, thus providing quick return to conditions where effective settling of the suspended solids and activated sludge flocs may be obtained.

Figure 4:
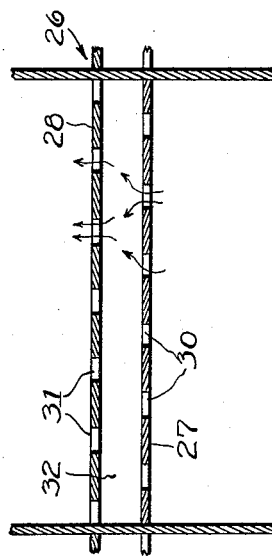
FIG. 4 is a top plan view of the double baffle means between an aeration and sedimentation segments of the tank.
Figure 5:
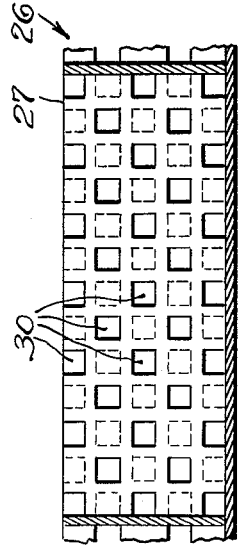
FIG. 5 is a side elevational view of a baffle element.

As shown in FIGS. 4 and 5, baffle unit 26 consists of spaced perforate walls 27 and 28 and extend across the entire width and depth of the tank 10. Walls 27 and 28 are provided with openings of appropriate size and configuration 30 and 31, respectively. Perforations or openings in walls 27 and 28 are positioned so that the openings are staggered. This staggered open arrangement causes liquid passing through an opening in the upstream wall 27 to impinge on a wall section in downstream wall 28. This blocking of the stream creates a multiplicity of discontinuous channels through said baffle and causes the sewage to move transversely in a space 32 between baffle walls 27 and 28 before escaping in a multiplicity of circuitous paths through openings 31 into the quiescent sedimentation segment 34 of tank 10.

On downstream wall 28 at approximately the liquid level in sedimentation segment 34 and adapted for adjustability in depth is a scum trough 35. Trough 35 is adapted to receive floating debris, scum, grease, etc., forced to the upstream end of sedimentation segment 34 by the return of flights or skimming blade of sludge collector 36.

Sludge collector 36 is illustrated as consisting of paired continuous chains 37 mounted parallel to opposite walls of the tank and supported by paired sprockets 38, 39, 40 and 41. Secured between the paired chains 37 are flights or scraper plates 42 of suitable configuration. Flights may be of suitable material of construction such as wood or metal adapted for support by chains 37 through suitable linkages. Movement is imparted to the sludge collector 36 through a conventional electric motor drive for one of the sprockets as, for example, sprocket 41.

In the preferred embodiment of the invention shown, sedimentation segment 34 of tank 10 is provided with a sump 45 near the midpoint in said segment, the floor being sloped or inclined at a small angle toward the sump. The downstream half of sedimentation segment 34 is provided with a second sludge collector 46 of construction similar to collector 36 adapted to move sludge in the upstream direction along the sloped floor of segment 34. Collector 46 does not require liquid level return so is supported by suitable paired sprockets 48a, 48b and 48c. The collector 46, like collector 36 is driven by conventional electric motor drive, as for example, through sprocket 48a.

Settled activated sludge is removed from sump 45 by means of an air lift 50 and discharged into a sludge channel 51. Sludge accumulated in the sump 45 is moved to the inlet of air lift 50 by a sludge collector 52 of design similar to collectors 36 and 46. Sludge collector 52 consists of paired chains 53 supported by paired sprockets 54, 55 and 56. Flights or scraper plates 57 are secured by suitable linkages to both chains 53. Final effluent removal is provided at the downstream end of segment 34 of tank 10 through multiple overflow weirs 58 which discharge the clarified liquid into an effluent channel 59.

Description herein has been limited to that of a single tank. A sewage treatment plant will usually consist of a number of tanks. FIG. 3 shows a plan view of a plant consisting of tanks 60 to 67 inclusive, positioned for operation in parallel. Tanks 60 to 67 receive sewage from screening station 14 through sludge channel 15 for treatment as in tank 10. Sludge channel 51 delivers activated sludge and solids to a splitter 68. One portion of this activated sludge is discharged to channel 15 for recycle in the system. The balance of the activated sludge, either return sludge, aerator liquor or a mixture of both to conform with the desired treatment operation, is delivered through conduit 69 to sludge thickeners 70. Provision is made for pumping the overflow from thickener 70 through pipe 71 for return to the system through channel 15. Thickened activated sludge and solids are delivered through pipe 72 to digesters 73. Digested sludge discharged from digester 73 may be conducted by suitable means, such as conduit 74, to a disposal area.

For example, in the operation of a modified aeration activated sludge system in accordance with this invention, a sewage which after screening contains approximately 175 p.p.m. of suspended solids and has a five day B.O.D. of approximately 160, may be delivered to the grit chamber of tank 10 where grit drops out and is removed.

Into the aeration tank gas may be introduced of approximately 500 cubic feet of air per pound of B.O.D. Suspended solids in the mixed liquor in the aeration tank for such a plant may be approximately 400 p.p.m.

Sludge settled in the sedimentation segment is removed and about 10% of the amount of the incoming flow is recycled to the aeration segment. Excess sludge is fed to thickeners, digesters and final disposal. The final effluent may show about 50 p.p.m. of suspended solids and a B.O.D. of about 65. This constitutes a removal of about 71% suspended solids and about 60% B.O.D.

The new system herein described has numerous economic advantages. When using separate tanks for grit chamber, aeration tank and sedimentation tank, a hydraulic head of 5 to 7 feet may be required to allow passage of sewage from one end of the system to the other. In contrast, when flowing suspensions through the equipment of the instant invention the loss of hydraulic head is negligible with the consequent savings in pumping cost. Further, a unit of the instant invention will increase the operating efficiency of the plant as a whole. When utilizing conventional separate tanks, short circuiting and nonuniform distribution of flow frequently occur due to inadequacy or failure of control means such as individual influent conduits, gates and weirs. In the instant apparatus, the flow is distributed uniformly across the active cross section of each of the tank compartments, thus eliminating short circuiting and other detriments to treatment efficiency.

Units of the type above described are of a nature permitting appreciable saving in space and in construction costs. In highly populated areas where space commands a high price, capital cost savings of thousands of dollars are readily realized due to increased throughput per unit of volume and plant operating efficiency which make it possible to utilize smaller plants than could be used either for conventional or so called high rate treatment plants.

It will of course be understood that a multiple segment tank may contain a number of different operational segments arranged in various combinations. For example, the segments in sequence, may consist of an aeration segment followed by a sedimentation segment, or a grit chamber, aeration segment and sedimentation segment, or a primary settler, aeration segment and sedimentation segment or a grit chamber, primary settler, aeration segment, and sedimentation segment, etc. In any of the various arrangements, the described baffle means may be utilized as dividers between segments at one or more points in the tank to produce the maximum utilization of the downstream tank segment as, for example, for sedimentation purposes and thereby to achieve optimum overall treatment efficiency.

I claim:

1. Apparatus for treatment of sewage comprising a tank having bottom, end and side walls, an inlet adjacent the top of the upstream end wall through which sewage is introduced, a dam longitudinally spaced from said upstream end wall, said dam extending from the tank floor and partially obstructing the cross sectional area of said tank, means for introducing air upwardly into the body of the sewage from a region above the bottom of the tank and adjacent said upstream end wall, spaced multiple wall means extending transverse to the direction of liquid flow and adapted with a multiplicity of non-aligned inlets to and outlets from the space between said wall means for circuitous liquid flow, said inlets and outlets being spaced vertically and laterally over the area of said wall means, said means being longitudinally spaced from said dam dividing said tank into additional segments, means for introducing air into the body of the suspension in an aeration segment for said tank, sludge removal means mounted within a settling segment of said tank for discharge of settled solids exteriorly of said tank, overflow means for control of liquid level in said tank and discharge means for liquor from the last segment of said tank.

2. Apparatus for treatment of sewage, comprising a tank having bottom, end and side walls, an inlet adjacent the top of the upstream end wall through which sewage is introduced, a dam longitudinally spaced from said upstream end wall extending from the tank floor and partially obstructing the cross sectional area of said tank, flow-through baffle means longitudinally spaced from said dam dividing the balance of said tank into an aeration segment and a sedimentation segment, said baffle consisting of spaced plate members, each of said plate members being provided with a plurality of openings with the openings being positioned opposite an unperforated area in each adjacent plate, said openings being spaced vertically and laterally over the area of said plates, means for introducing air into the body of liquid in the aeration segment of said tank, sludge removal means mounted within said sedimentation segment for discharge of settled solids exteriorly of said tank, overflow means for control of liquid level in said tank and discharge means for removal of clarified liquor from the sedimentation segment of said tank.

3. Apparatus for treatment of sewage comprising a tank having bottom, end and side walls, an inlet adjacent the top of the upstream end wall through which sewage is introduced, a dam longitudinally spaced from said upstream end wall extending from the tank floor and partially obstructing the cross sectional area of said tank, spaced multiple wall means adapted with a multiplicity of non-aligned inlets to and outlets from the space between said wall means for circuitous liquid flow, said inlets and outlets being spaced vertically and laterally over the area of said wall means, said means being longitudinally spaced from said dam dividing the balance of said tank into an aeration segment and a sedimentation segment, means for introducing air into the body of liquid in the aeration segment, a sump positioned intermediate said spaced wall means and the downstream closure wall for said tank, continuous sludge collection means adapted to move settled sludge to said sump, conveying means for removing sludge from said sump, a set-back overflow weir for control of liquid level in said tank adjacent said downstream closure wall and an outlet for effluent liquor in communication with said overflow weir.

4. Apparatus for treatment of sewage comprising a tank having bottom and side walls, an inlet adjacent the top of the upstream end wall through which sewage is introduced, a dam longitudinally spaced from said upstream end wall extending from the tank floor and partially obstructing the cross sectional area of said tank, means for removal of grit from the area between said end wall and dam, spaced multiple wall means adapted with a multiplicity of non-aligned inlets to and outlets from the space between said wall means for circuitous liquid flow, said inlets and outlets being spaced vertically and laterally over the area of said wall means, said means being longitudinally spaced from said dam dividing the balance of said tank into an aeration segment and a sedimentation segment, means for introducing air into the body of liquid in the aeration segment, a sump positioned intermediate said spaced multiple wall means and the downstream closure wall for said tank, continuous sludge collection means adapted to move settled sludge to said sump, conveying means for removing sludge from said sump, a set-back overflow weir for control of liquid level in said tank adjacent said downstream closure wall and an outlet for effluent liquor in communication with said overflow weir.

5. Apparatus for treatment of sewage comprising a tank having bottom and side walls, an inlet adjacent the top of the upstream end wall through which sewage is introduced, a dam longitudinally spaced from said upstream end wall extending from the tank floor and partially obstructing the cross sectional area of said tank, spaced multiple wall means adapted with a multiplicity of nonaligned inlets to and outlets from the space between said wall means for circuitous liquid flow, said inlets and outlets being spaced vertically and laterally over the area of said wall means, said means being longitudinally spaced from said dam dividing the balance of said tank into an aeration segment and a sedimentation segment, means for introducing air into the body of liquid in the aeration segment, a scum trough mounted on the downstream side of said spaced multiple wall means, a sump positioned intermediate said spaced multiple wall means and the downstream closure wall for said tank, continuous sludge collection means adapted to move settled sludge to said sump, and to travel upstream at approximately the liquid level in said tank to move floating material to said scum trough, conveying means for removing sludge from said sump, a set-back overflow weir for control of liquid level in said tank adjacent said downstream closure wall and an outlet for effluent liquor in communication with said overflow weir.

6. In a method for the treatment of sewage having the solids thereof in a suspendable particle size form, the steps comprising flowing said sewage into a segmented unitary flow course having a first segment turbulent zone and a quiescent zone, maintaining the liquid level of the flow course by withdrawing at least partially clarified liquor from said quiescent zone, maintaining turbulent conditions in the first flow segment, continuously flowing liquid out of said first flow segment in a multiplicity of separate streams positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, accumulating precipitating solids in the bottom of said quiescent zone, removing precipitated solids from the bottom of said quiescent zone and discharging at least partially clarified liquor from said zone where the solids are precipitated.

7. In a method for the treatment of sewage the steps comprising flowing sewage the solids of which are in a suspendable particle size form into a segmented flow course having a first segment turbulent zone and a quiescent zone, maintaining liquid level of the flow course by withdrawing clarified liquor from at least one outlet longitudinally removed from the sewage inlet, aerating sewage in the first flow segment with air in a volume whose minimum is that required to maintain circulation, continuously flowing liquid out of said first flow segment in a multiplicity of separate streams laterally spaced and positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, accumulating precipitated solids in the bottom of the last flow course segment, removing precipitated solids from the bottom of said last flow course segment and discharging clarified liquor over said weir to a disposal zone.

8. In a method for treatment of raw sewage the steps comprising flowing raw sewage, the solids of which are in suspendable particle size form into a flow course segmented into a first segment, a turbulent zone and a quiescent zone and having continuous liquid flow therethrough, maintaining the liquid level of the entire flow course by withdrawing clarified liquor over a weir longitudinally removed from the sewage inlet, introducing sewage into a first tank segment where liquid flow is insufficient to maintain some of the solids in suspension, aerating sewage in an aeration zone contiguous to and downstream from the first flow course segment with air in a volume whose minimum is that required to maintain circulation, continuously flowing liquid out of said aeration zone in a multiplicity of separate streams positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, accumulating precipitated solids in the bottom of said first flow course segment, removing precipitated solids from said first segment and discharging flowing material from said next segment of said flow course.

9. In a method for treatment of sewage, the steps comprising flowing sewage into a flow course segmented into a first flow segment, a turbulent zone and a quiescent zone and having continuous liquid flow therethrough, the solids of the sewage being in a suspendable particle size form, maintaining the liquid level of the entire flow course by withdrawing clarified liquor over a weir accepting liquid from said quiescent zone, obstructing the lower portion of said flow course at a point longitudinally spaced from the sewage inlet to form a first flow course segment in which liquid flow is insufficient to maintain grit in suspension, removing settled grit from said first segment, introducing air into the sewage as it flows in the turbulent zone contiguous to and downstream from the first flow course segment, said air being in a volume whose minimum is that required to maintain circulation, continuously flowing liquid out of said turbulent zone in a multiplicity of separate streams laterally spaced and positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, accumulating precipitated solids in the bottom of said quiescent zone, and removing precipitated solids from said quiescent zone.

10. In a method for treatment of sewage, the steps comprising flowing sewage into a flow course segmented into a first flow segment, a turbulent zone and a quiescent zone and having continuous liquid flow therethrough, the solids of the sewage being in a suspendable particle size form, maintaining the liquid level of the entire flow course by withdrawing clarified liquor over a weir longitudinally removed from the sewage inlet, obstructing the lower portion of said flow course at a point longitudinally spaced from the sewage inlet to form said first flow course segment, introducing air into the body of the sewage from a region below the flow course inlet which region is removed from the floor of the segment and along a boundary of said flow course, removing settled grit from below the level of air introduction, introducing air into the sewage in the zone contiguous to and downstream from the first flow course segment in quantities sufficient to maintain turbulence, continuously flowing liquid out of said turbulent zone in a multiplicity of separate streams laterally spaced and positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, accumulating precipitated solids in the bottom of said quiescent zone, removing precipitated solids from said quiescent zone and discharging clarified liquid as overflow from said quiescent zone.

11. In a method for treatment of sewage, the steps comprising flowing sewage into a flow course segmented into a first flow segment, a turbulent zone and a quiescent zone and having continuous flow of liquid therethrough, the solids of the sewage being in a suspendable particle size form, maintaining the liquid level of the entire flow course by withdrawing clarified liquor over a weir longitudinally removed from the sewage inlet, obstructing the lower portion of said flow course at a point longitudinally spaced from the sewage inlet to form said first flow course segment, introducing air into the body of the sewage from a region below the flow course inlet which region is removed from the floor of the segment and along a boundary for said flow course, the amount of said air introduced being sufficient to induce a maximum circulatory flow of 2 feet per second at the liquid surface, removing settled grit from below the level of air introduction, introducing air into the sewage in the zone contiguous to and downstream from the first flow course segment, said air being in a volume creating turbulence and providing between about 250 and 1,500 cubic feet per pound of Biochemical Oxygen Demand, continuously flowing liquid out of said turbulent zone in a multiplicity of separate streams positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, precipitating solids from the aerated sewage in said quiescent zone, moving said precipitated solids to an accumulation zone, removing said solids from said accumulation zone to a point outside of said flow course and discharging the clarified liquor from said contiguous segment following the aeration segment.

12. In a method for the treatment of sewage the steps comprising flowing raw sewage having a loading between about 25 and 150 pounds of B.O.D. per 1,000 cubic feet of tank volume into the first segment of a segmented flow course, the solids of said sewage being in a suspendable particle size form, maintaining the liquid level of the flow course by withdrawing clarified liquor over a weir longitudinally removed from the sewage inlet, obstructing the lower portion of said flow course at a point longitudinally spaced from the sewage inlet to form a first flow course segment communicating directly with the contiguous flow course segment through the unobstructed portion of said flow course, introducing air into the body of the sewage in said first segment from a region below the flow course inlet which region is removed from the floor of the segment and along a boundary for said flow course, removing settled grit from below the level of air introduction, introducing air into the sewage in the zone contiguous to and downstream from the first flow course segment in a volume creating turbulence, said air being in a volume providing between about 250 and 1,500 cubic feet per pound of B.O.D., continuously flowing liquid out of said turbulent zone in a multiplicity of separate streams positioned at a multiplicity of elevational levels extending from the bottom of the flow course to the liquid level maintained in said flow course into an isolated zone of stream contacting between said turbulent and quiescent zones to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into said quiescent zone, skimming off material floating at the surface of the liquid in the turbulent zone, precipitating solids from the aerated sewage in said quiescent zone segment following said turbulent zone, moving the precipitated solids to an accumulation zone centrally located in said segment following the aeration segment, air lifting the accumulated solids out of said flow course and overflowing clarified liquid from said segment of said flow course following the aeration segment.

13. In a method for the treatment of sewage the steps comprising flowing raw sewage having a loading between about 25 and 150 lbs. of B.O.D. per 1,000 cubic feet of tank volume into the first segment of a unitary flow course, the solids of said sewage being in the suspendable particle size form, maintaining the liquid level of the flow course by withdrawing clarified liquor from at least one outlet longitudinally removed from the sewage inlet, maintaining sewage circulation in said first tank segment insufficient to maintain heavy solids in suspension, aerating sewage in the zone contiguous to and downstream from the first flow course segment with air in a volume sufficient to maintain turbulence, continuously flowing liquid out of said turbulent zone in a multiplicity of separate streams positioned at a multiplicity of elevational levels extending from the bottom of the flow course to the liquid level maintained in said flow course into an isolated zone of stream contacting to eliminate the turbulence from said effluent from said first segment, passing the liquid from said isolated zone in a multiplicity of separate streams positioned out of axial alignment with the axis of incoming streams, said streams leaving said isolated zone being spaced laterally and vertically to provide even distribution of flow into a quiescent last segment of said flow course, accumulating precipitated solids in the bottom of said quiescent segment, removing precipitated solids from said quiescent segment, returning a portion of said removed precipitated solids to the turbulent zone, and discharging clarified liquid as overflow from said segment of said flow course following aeration.

14. Apparatus for treatment of sewage comprising a tank having a bottom, end and side walls, inlet means for introduction of sewage into said tank, spaced multiple wall means extending transverse to the direction of liquid flow and adapted with a multiplicity of non-aligned inlets to and outlets from the space between said wall means, said inlets and outlets being spaced vertically and laterally over the area of said wall means and said space between said wall means providing an isolated zone for mixing of the inlet streams to dampen the liquid turbulence, said multiple wall means being longitudinally spaced from the upstream end wall and dividing said tank into agitation and settling segments, means for creating turbulence in the body of said liquid in the agitation segment of said tank, sludge removal means mounted within said segment operating under conditions to permit solids settling for discharge of settled solids exteriorly of said tank, overflow means for control of liquid level in said tank and discharge means for removal of liquor from the segment of said tank furthest removed from said sewage inlet.

15. Apparatus for treatment of sewage comprising a tank having bottom, end and side walls, and inlet adjacent the top of the upstream end wall through which sewage is introduced, spaced multiple wall means extending transverse to the direction of liquid flow and adapted with a multiplicity of non-aligned inlets to and outlets from the space between said wall means, said inlets and outlets being spaced vertically and laterally over the area of said wall means and said space between said wall means providing an isolated zone for mixing of the inlet streams to dampen the liquid turbulence, said multiple wall means being longitudinally spaced from said upstream end wall and dividing said tank into an agitation segment and a sedimentation segment, means for introducing gas into the body of liquid in the agitation segment of said tank, sludge removal means mounted within said sedimentation segment for discharge of settled solids exteriorly of said tank, overflow means for control of liquid level in said tank and discharge means for removal of clarified liquor from the sedimentation segment of said tank.

16. Apparatus for treatment of sewage comprising a tank having bottom, end and side walls, an inlet adjacent the top of the upstream end wall through which sewage is introduced, spaced multiple wall means extending transverse to the direction of liquid flow and adapted with a multiplicity of non-aligned inlets to and outlets from the space between said wall means, said inlets and outlets being spaced vertically and laterally over the area of said wall means and said space between said wall means providing an isolated zone for mixing of the inlet streams to dampen the liquid turbulence, said multiple wall means being longitudinally spaced from said upstream end wall and dividing said tank into a settling segment and a turbulence segment, means for introducing gas into the body of liquid in the turbulence segment of said tank, sludge removal means mounted within the settling segment for discharge of settled solids exteriorly of said tank, overflow means for control of liquid level in said tank and discharge means for liquor flowing from the turbulence segment.

17. Apparatus for treatment of sewage comprising a tank having bottom, end and side walls, an inlet adjacent the top of the upstream end wall through which sewage is introduced, flow-through baffle means longitudinally spaced from said upstream end wall and dividing said tank into an aeration and a sedimentation segment, said baffle consisting of spaced plate members, each of said plate members being provided with a plurality of openings with each of said openings being positioned opposite an unperforated area in each adjacent plate, said openings being spaced vertically and laterally over the area of said plates, and said space between said wall means providing an isolated zone for mixing of the inlet streams to dampen the liquid turbulence, means for introducing air into the body of said liquid intermediate said end wall and said baffle means, sludge removal means mounted within said sedimentation segment for discharge of settled solids exteriorly of said tank, overflow means for control of liquid level in said tank and discharge means for removal of clarified liquor from the sedimentation segment of said tank.

References Cited in the file of this patent

UNITED STATES PATENTS

| 1,431,367 | Buchi | Oct. 10, 1922 |
| 2,272,441 | Streander | Feb. 20, 1942 |
| 2,343,179 | Hauck | Feb. 29, 1944 |
| 2,628,190 | Langdon | Feb. 10, 1953 |
| 2,920,763 | Lind et al. | Jan. 12, 1960 |

FOREIGN PATENTS

| 1,098,155 | France | Mar. 2, 1955 |